(12) United States Patent
Kusafuka et al.

(10) Patent No.: US 6,450,919 B2
(45) Date of Patent: Sep. 17, 2002

(54) CONTROLLER FOR AUTOMATIC TRANSMISSION

(75) Inventors: Muneo Kusafuka; Masamichi Unoki; Masakatsu Iwase, all of Anjo (JP)

(73) Assignee: Aisin AW Co., Ltd. (JP)

( * ) Notice: Subject to any disclaimer, the term of this patent is extended or adjusted under 35 U.S.C. 154(b) by 19 days.

(21) Appl. No.: 09/788,418

(22) Filed: Feb. 21, 2001

(30) Foreign Application Priority Data

Feb. 23, 2000 (JP) ........................................ 2000-045287

(51) Int. Cl.[7] .............................................. F16H 61/10
(52) U.S. Cl. ..................... 477/115; 477/97; 477/120; 74/335; 701/55; 701/66
(58) Field of Search .............................. 477/115, 120, 477/97; 74/335, 336 R; 701/55, 56, 64, 66, 70

(56) References Cited

U.S. PATENT DOCUMENTS

| | | | |
|---|---|---|---|
| 4,551,802 A | * 11/1985 | Smyth | 477/78 |
| 4,679,145 A | * 7/1987 | Beeck et al. | 477/120 |
| 4,829,434 A | * 5/1989 | Karmel et al. | 477/129 |
| 4,897,790 A | * 1/1990 | Bieber | 477/131 |
| 5,123,301 A | 6/1992 | Hagele et al. | 74/866 |
| 5,157,609 A | * 10/1992 | Stehle et al. | 477/120 |
| 5,341,296 A | 8/1994 | Yasuno et al. | 364/426.01 |
| 5,389,050 A | 2/1995 | Sakai et al. | 477/78 |
| 6,375,597 B1 | * 4/2002 | Popp et al. | 477/111 |

* cited by examiner

Primary Examiner—Sherry Estremsky
Assistant Examiner—Tisha D. Lewis
(74) Attorney, Agent, or Firm—Lorusso & Loud

(57) ABSTRACT

An automatic transmission controller is capable of compensating for both driver type and tendencies of a driver in temporary acceleration, such as in passing. The automatic transmission controller executes a driver type judging subroutine for judging the overall acceleration habits of the driver and classifying the driver as one of a plurality of driver types by monitoring the driving behavior for a predetermined time. The controller also executes a temporary acceleration inclination judging routine for judging the habits of the driver in temporary acceleration by monitoring driving behavior for a period of time shorter than the predetermined time, and executes shift control routines for controlling and changing the shift timing based on the judged driver type and the inclination in temporary acceleration. The controller controls shift timing, taking into account both the driver type and the inclination in temporary acceleration, such as passing.

7 Claims, 15 Drawing Sheets

FIG. 4

┌─ FUZZY INFERENCE SECTION ─┐

─ FUZZY RULE (1) IF AVERAGE VEHICLE SPEED = LOW VEHICLE SPEED ACCELERATOR HIGH OPENING TIME = SHORT THEN OUTPUT = ECONOMY
(2) IF AVERAGE VEHICLE SPEED = LOW VEHICLE SPEED ACCELERATOR HIGH OPENING TIME = MEDIUM THEN OUTPUT = SPORTY
(3) IF AVERAGE VEHICLE SPEED = LOW VEHICLE SPEED ACCELERATOR HIGH OPENING TIME = LONG THEN OUTPUT = SPORTY
(4) IF AVERAGE VEHICLE SPEED = MEDIUM VEHICLE SPEED ACCELERATOR HIGH OPENING TIME = MEDIUM THEN OUTPUT = ECONOMY
(5) IF AVERAGE VEHICLE SPEED = MEDIUM VEHICLE SPEED ACCELERATOR HIGH OPENING TIME = MEDIUM THEN OUTPUT = ECONOMY
(6) IF AVERAGE VEHICLE SPEED = HIGH VEHICLE SPEED ACCELERATOR HIGH OPENING TIME = MEDIUM THEN OUTPUT = ECONOMY
(7) IF AVERAGE VEHICLE SPEED = HIGH VEHICLE SPEED ACCELERATOR HIGH OPENING TIME = LONG THEN OUTPUT = SPORTY
(8) IF AVERAGE VEHICLE SPEED = LOW VEHICLE SPEED AVERAGE ACCELERATOR STEP-ON SPEED = FAST THEN OUTPUT = SPORTY
(9) IF AVERAGE VEHICLE SPEED = MEDIUM VEHICLE SPEED AVERAGE ACCELERATOR STEP-ON SPEED = SLOW THEN OUTPUT = ECONOMY
(10) IF AVERAGE VEHICLE SPEED = MEDIUM VEHICLE SPEED AVERAGE ACCELERATOR STEP-ON SPEED = FAST THEN OUTPUT = SPORTY
(11) IF AVERAGE VEHICLE SPEED = HIGH VEHICLE SPEED AVERAGE ACCELERATOR STEP-ON SPEED = SLOW THEN OUTPUT = ECONOMY
(12) IF AVERAGE VEHICLE SPEED = HIGH VEHICLE SPEED AVERAGE ACCELERATOR STEP-ON SPEED = FAST THEN OUTPUT = SPORTY

EXAMPLE 1: In case when average vehicle speed is 30 km, accelerator high opening time is 5 seconds and average accelerator step-on speed is 10%/s: the average vehicle speed is determined to be low vehicle speed, the accelerator high opening time to be short and the average accelerator step-on time to be slow. Then, only the inference rule (1) is applied and the fuzzy output turns out to be zero.

EXAMPLE 2: In case when average vehicle speed is 60 km, accelerator high opening time is 15 seconds and average accelerator step-on speed is 35%/s: the average vehicle speed is determined to be medium vehicle speed, the accelerator high opening time to be short and medium and the average accelerator step-on time to be medium and fast. Then, the inference rules (4) and (9) are applied. Because the two inference rules are applied, the fuzzy output turns out to be 50 by using min-MAX centroid method.

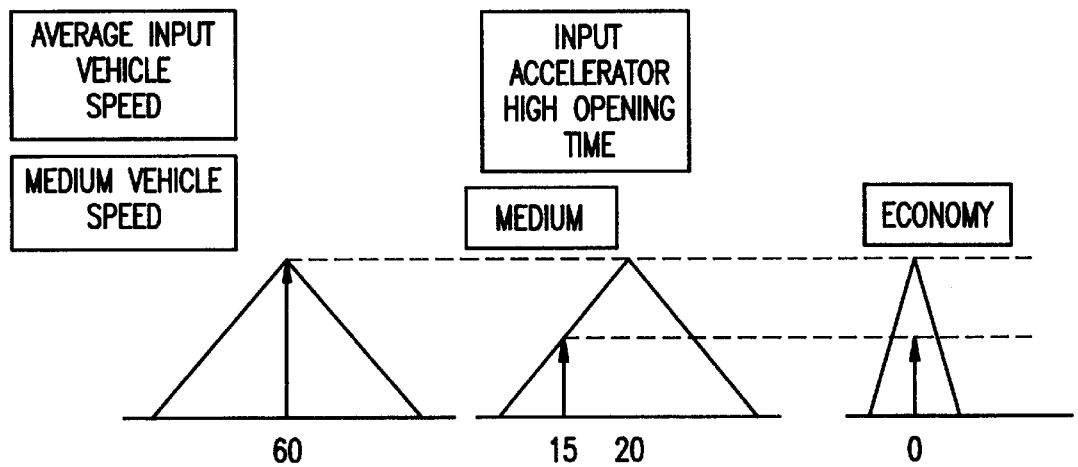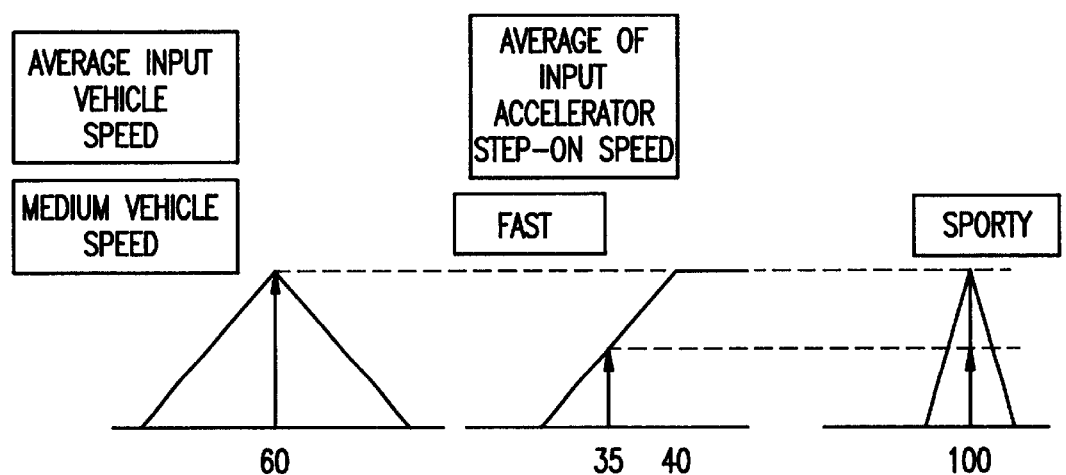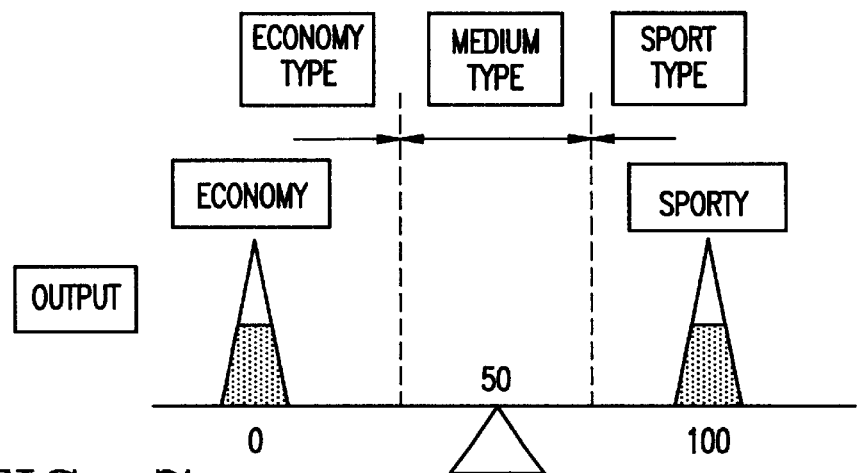
FIG. 7

FIG. 10a

ACCELERATOR OPENING
COMPENSATION FACTOR (*K)

|     | 40Km/h | 70Km/h | 100Km/h |
|-----|--------|--------|---------|
| 2ND | 1.5    | 1.5    | 1.5     |
| 3RD | 1.5    | 1.5    | 1.5     |
| 4TH | 2.0    | 2.0    | 2.0     |
| 5TH | 2.0    | 2.0    | 2.0     |

FIG. 10b

ACCELERATOR OPENING
COMPENSATION GUARD (*G)

| ECONOMY | 30% |
|---------|-----|
| MEDIUM  | 25% |
| SPORT   | 20% |

FIG. 12 ACCELERATOR QUICK STEP-ON AND DRIVER TYPE JUDGING TIMING CHART

CONTROLLER FOR AUTOMATIC TRANSMISSION

CROSS-REFERENCE TO RELATED APPLICATION

Our copending application Ser. No. 09/789,016 having the same title and filed on even date herewith discloses and claims related subject matter.

BACKGROUND OF THE INVENTION

1. Field of the Invention

The present invention relates to an automatic transmission controller which is capable of making a judgment emphasizing acceleration using two criteria judged at different times.

2. Related Art Statement

One known controller monitors the driving habits of a driver for a predetermined time to judge the type of the driver and to change the shift timing, initially set to a standard, to the timing intended by the driver based on that judgment.

However, with such a system it is necessary to monitor the driving habits of the driver for a relatively long time, e.g., about 30 seconds, to judge the type of the driver. That is, when a driver who stresses acceleration temporarily experiences a control scheme tailored to a driver who stresses fuel consumption, for example, the driver feels a sense of incompatibility because the driver has been judged to stress fuel consumption even though the driver actually stresses acceleration.

Further, such a system is unable to accommodate a temporary emphasis on acceleration, such as in passing, due to the driver type being judged over a relatively longer time. That is, when a driver who has been judged to be the type who normally stresses fuel consumption passes a car, there arises the problem that the driver is unable to make the intended acceleration because the shift timing is selectively changed toward the low-speed side based on determination of driver type through the monitoring of the driver for a relatively long time and the up-shift is made sooner, without sufficient acceleration.

Accordingly, the present invention has as its object provision of an automatic transmission controller which is capable of adequately accommodating a temporary emphasis on acceleration, such as in passing, even when the control shift timing is in accordance with a determination of driver type.

SUMMARY OF THE INVENTION

According to a first aspect, the present invention provides an automatic transmission controller capable of changing shift timing of a transmission in accordance with acceleration inclination of a driver. The transmission controller includes driver type judging means for judging the overall inclination of a driver in acceleration as one of a plurality of driver types by monitoring the driving behavior for a predetermined time, e.g., around 30 seconds; temporary acceleration inclination judging means for judging inclination of the driver in temporary acceleration by monitoring the driving behavior for a time shorter than the predetermined time; and shift control means for controlling and changing the shift timing based on the driver type judged by the driver type judging means and the temporary acceleration inclination judged by the temporary acceleration inclination judging means. Thus, it becomes possible to control the shift timing in a highly advanced manner taking into consideration both the overall inclination in acceleration and the inclination in temporary acceleration for an individual.

The terminology "acceleration inclination" as used herein means behavior of a given driver in accelerating, as monitored over some period of time. It can also be characterized as a behavior pattern, habit or tendency.

According to a second aspect of the invention, the temporary acceleration inclination judging means judges whether or not the driver intends a temporary acceleration by judging whether or not the accelerator has been quickly applied. Thus, it becomes easier to detect the true inclination of the driver in acceleration and the possibility of erroneous detection is reduced.

According to a third aspect of the invention, the temporary acceleration inclination judging means in accordance with the second aspect, judges that the driver intends a temporary acceleration when the speed of accelerator depression exceeds a predetermined value.

According to a fourth aspect of the invention, the shift control means in accordance with the first aspect, changes the shift timing in a manner talking into account the driver type based on a temporary acceleration judged by the temporary acceleration inclination judging means. Thus, it is possible to appropriately adjust for inclination in temporary acceleration, such as in passing, in addition to the change in shift timing per driver type.

According to a fifth aspect of the invention, shift timing for each driver type is stored in as a shift map (see the economy mode map ECONOMY in FIG. 13, medium mode map MEDIUM in FIG. 14 and sport mode map SPORT in FIG. 15, for example) wherein accelerator opening is plotted against vehicle speed. The shift control means computes compensation of the accelerator opening (CP) based on the inclination of temporary acceleration, computes a shift map retrieving accelerator opening wherein the compensation is added to the actual accelerator opening (AC) of the driver and changes the shift timing in accordance with the shift map retrieved based on the computed shift map retrieving accelerator opening. Because the change of the shift timing to be made in connection with temporary acceleration may be made by using the same shift map as that prepared for each driver type, by computing the shift map retrieving accelerator opening, the control is simplified.

According to a sixth aspect-of the invention, the driver type judging means judges that the driver type is one of at least into two driver types, including a high acceleration inclination type ("sport type", for example) and a low acceleration inclination type ("economy type", for example) and the shift control means limits the accelerator opening compensation (CP) as the driver type becomes closer to the higher acceleration inclination type. This makes it possible to prevent a situation wherein the shift timing (sport mode shift map SPORT) originally set at the high-speed side is shifted further to the high-speed side by a sudden accelerator operation and no upshift is made, when a driver of the driver type who stresses acceleration (the sport type driver) tries to pass. Thus, a smooth shift operation is provided. Alternatively, according to a seventh aspect of the invention, the driver type judging means raises the maximum value (*G) of the accelerator opening compensation as the driver type becomes closer to the low acceleration inclination type. Thus, it becomes possible to downshift and upshift according to the inclination in temporary acceleration and to allow the driver to accelerate appropriately as intended, because a large shift map retrieving accelerator opening is set even when the driver is the type who stresses economy of fuel consumption, for whom the shift timing has been shifted to the lower speed side, tries to pass.

The above and other advantages of the invention will become more apparent from a reading of the following description and the accompanying drawings.

BRIEF DESCRIPTION OF THE DRAWINGS

FIG. 4 shows the details of a fuzzy inference routine (S4 in FIG. 3);

FIG. 7 is a diagram showing other examples of output of arithmetic operations by the fuzzy inference routine;

FIGS. 10(a) and 10(b) are tables of accelerator opening compensation factors and accelerator opening compensation guards;

INCORPORATION BY REFERENCE

The teachings of Japanese Application No. 2000-45287, filed Feb. 23, 2000 are incorporated herein in their entirety, inclusive of the specification, claims and drawings.

DESCRIPTION OF THE PREFERRED EMBODIMENTS

Figure 1:
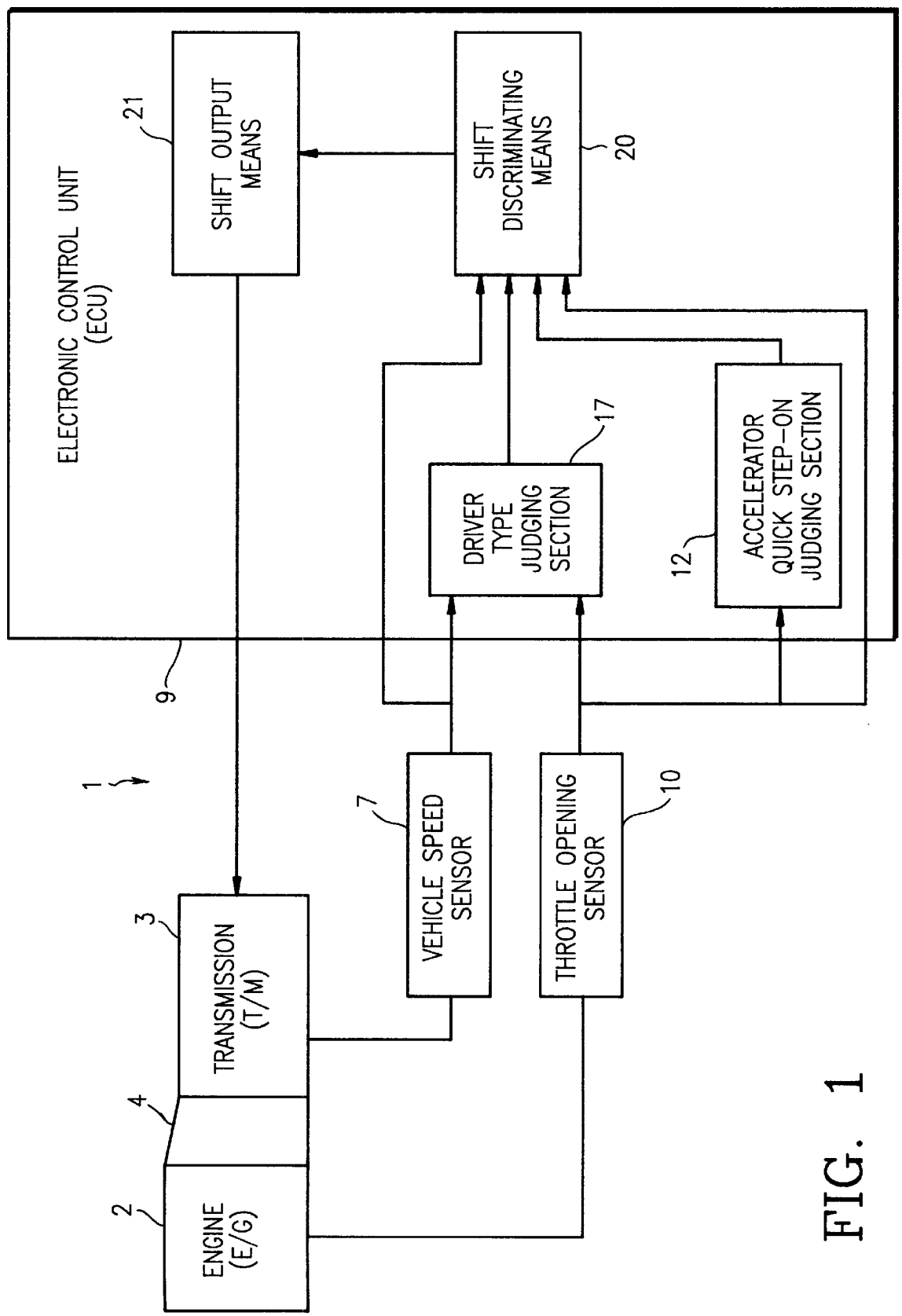
FIG. 1 is a block diagram illustrating one embodiment of an automatic transmission controller in accordance with the present invention.

As shown in FIG. 1, a vehicle 1 such as a car has an engine 2 which is connected to a transmission 3 via a torque converter 4. The transmission 3 is provided with a speed sensor 7 which detects the rotary speed of the output shaft of the transmission 3 and the engine 2 is provided with a throttle opening sensor 10.

The vehicle speed sensor 7 and the throttle opening sensor 10 are connected to an electronic control unit (ECU) 9 for controlling the transmission 3. The electronic control unit 9 comprises an accelerator ("quick, step-on") judging section 12, a driver type judging section 17, shift determining means 20, and shift output means 21.

In the vehicle 1 as described above, the rotation of the engine 2 is transmitted to the transmission 3 via the torque converter 4 and is decelerated by the transmission 3 for transfer to the wheels via an axle (not shown), i.e., to the vehicle drive wheels. The electronic control unit 9 controls the transmission 3 to change the speed of rotation input from the engine 2 in accordance to a predetermined shift map so that the optimum driving force can be obtained at the wheels and, in doing so, it also controls the transmission 3 in a manner appropriate to the driving style of the driver, i.e., in accordance with the driver type, the degree of accelerator depression by the driver and the like. The details of this control will be described below.

Figure 2:
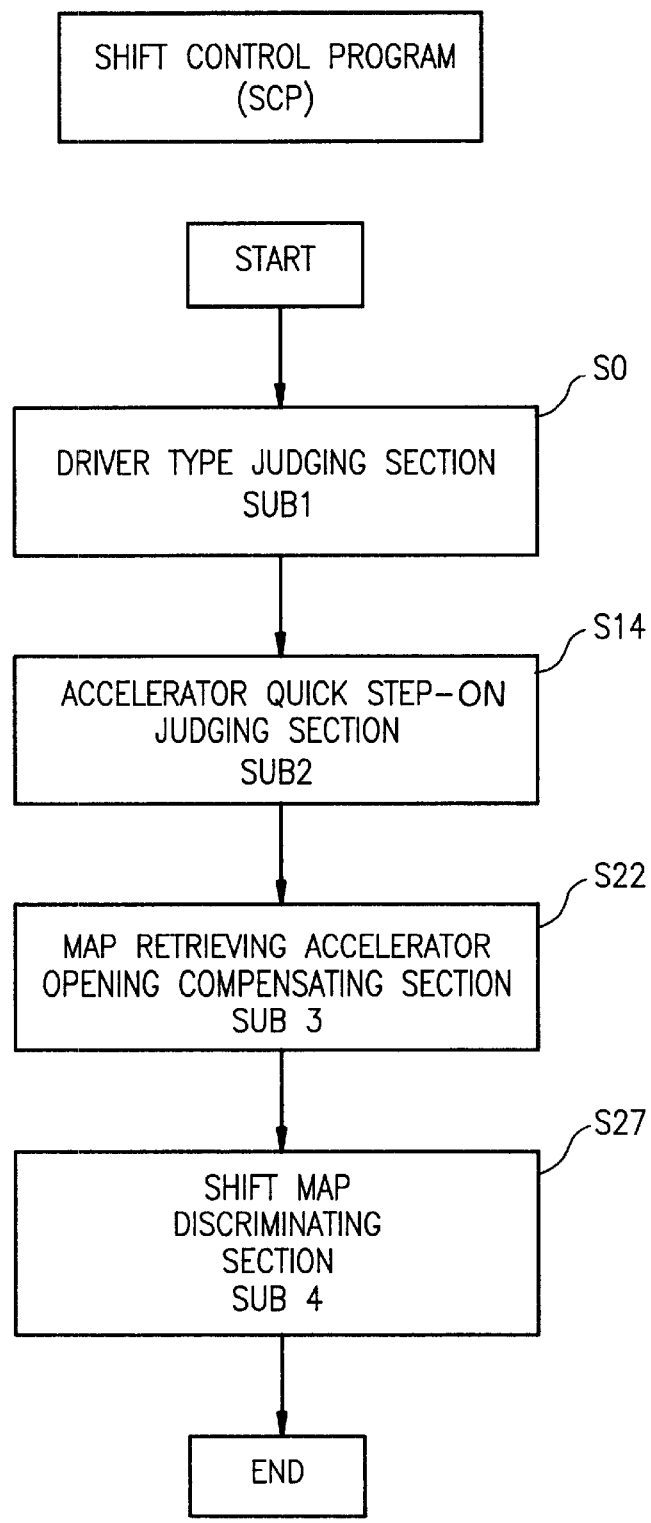
FIG. 2 is a flowchart of one example of a shift control program in accordance with the present invention.

While running the vehicle 1, the electronic control unit 9 reads a shift control program SCP, such as shown in FIG. 2, from a memory (not shown) to execute the program in a predetermined cycle and to control the transmission 3 based on that program.

As shown in FIG. 2, the shift control program SCP determines the overall habits (tendencies) of acceleration of the driver currently driving the vehicle by monitoring the driving behavior for a predetermined time. This monitoring is by the driver type judging section 17 of the electronic control unit 9 in Step S1. That is, it determines whether the driver is a sports type driver who prefers sporty driving, an economy type driver who prefers economical driving or a medium type driver who is between them.

Figure 3:
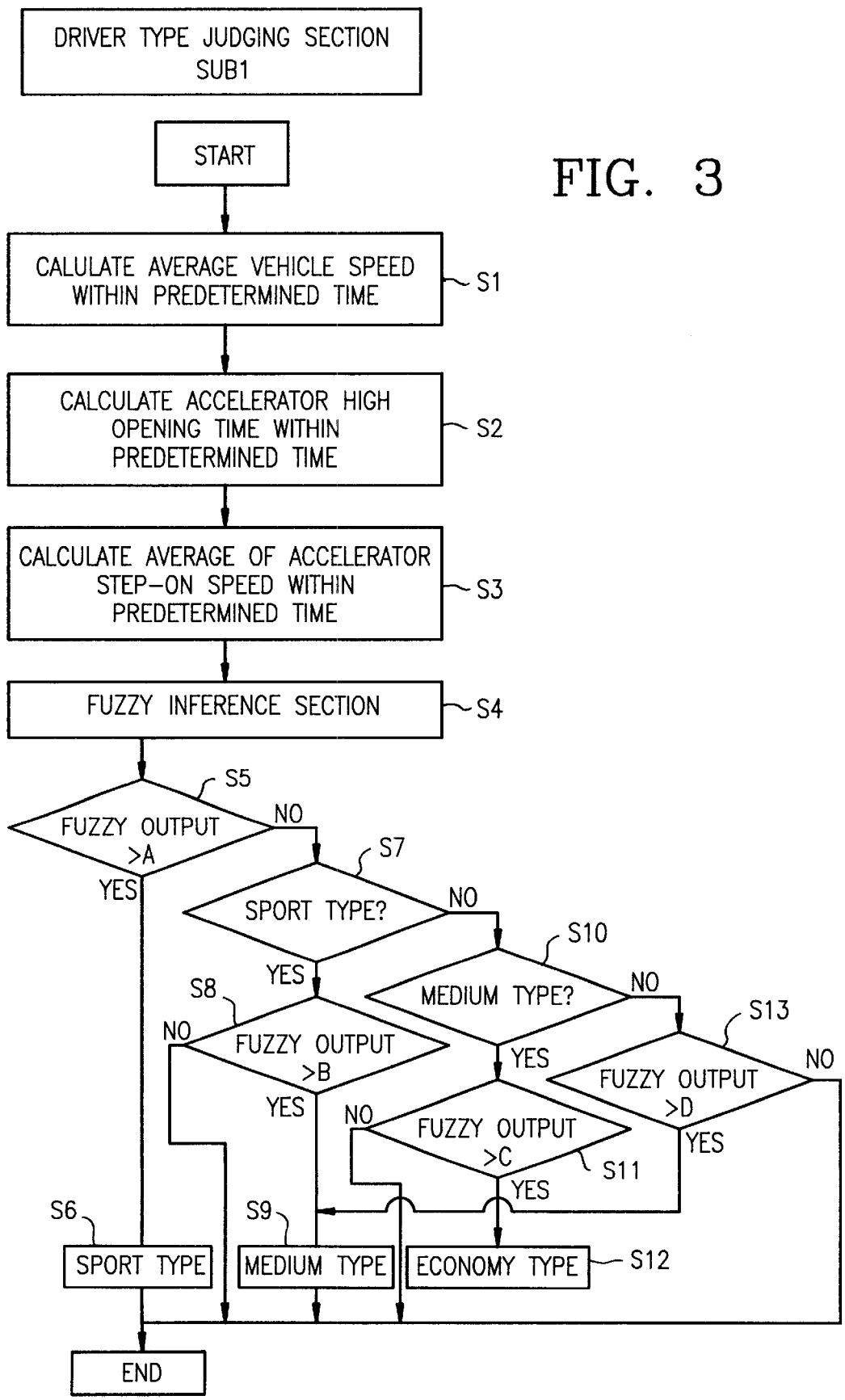
FIG. 3 is a flowchart of a driver type judging subroutine ("SUB1") in FIG. 2.

That is, the driver type judging section 17 executes a driver type judging subroutine SUB1, such as shown in FIG. 3. The driver type judging section 17 first calculates average vehicle speed, within a predetermined time of about 30 seconds, from the output of the vehicle speed sensor 7 in Step S1 and calculates a time during which the accelerator is operated with a high degree of opening within the predetermined time from the output of the throttle opening sensor 10 in Step S2. It also calculates an average value for speeds of accelerator depression within the predetermined time in Step S3. Then, based on the results of those calculations, it determines the driver type utilizing a fuzzy inference routine based on fuzzy inference and outputs points within a range from 0 as the lower limit to 100 as the upper limit.

Figure 5:
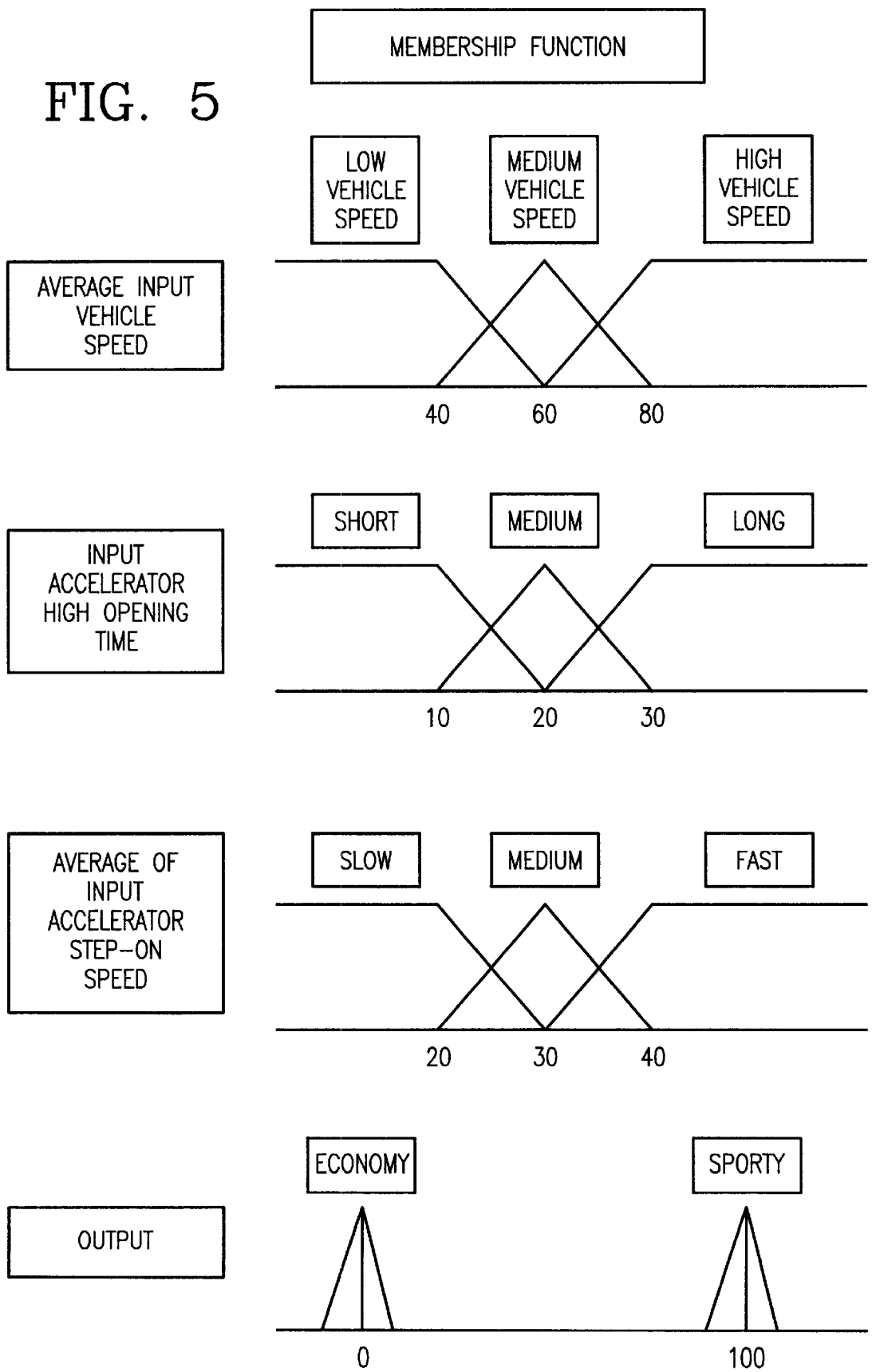
FIG. 5 is a diagram showing one example of the membership function in the fuzzy inference routine.
Figure 6:
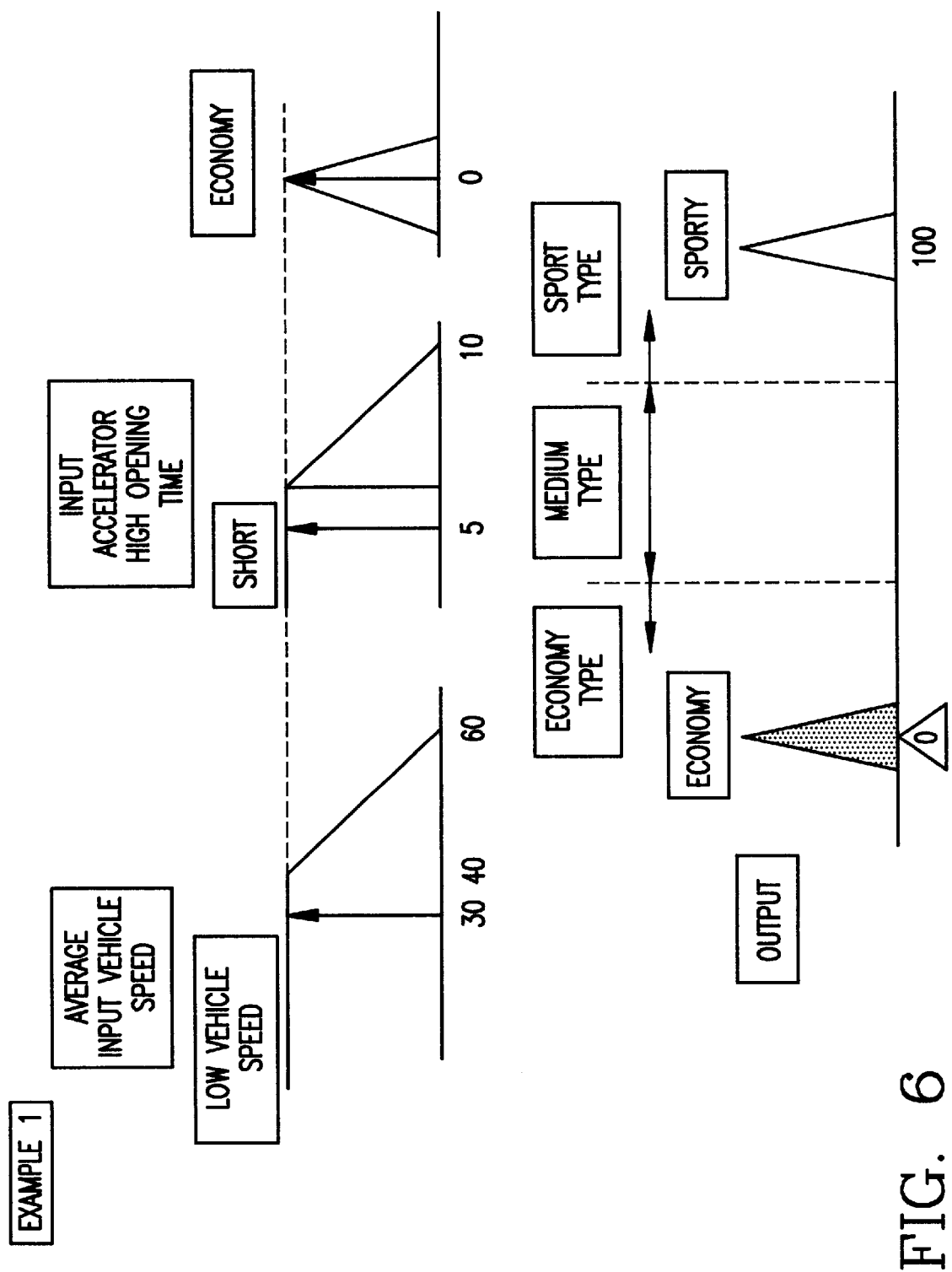
FIG. 6 is a diagram showing examples of output of arithmetic operations by the fuzzy inference routine.
Figure 8:
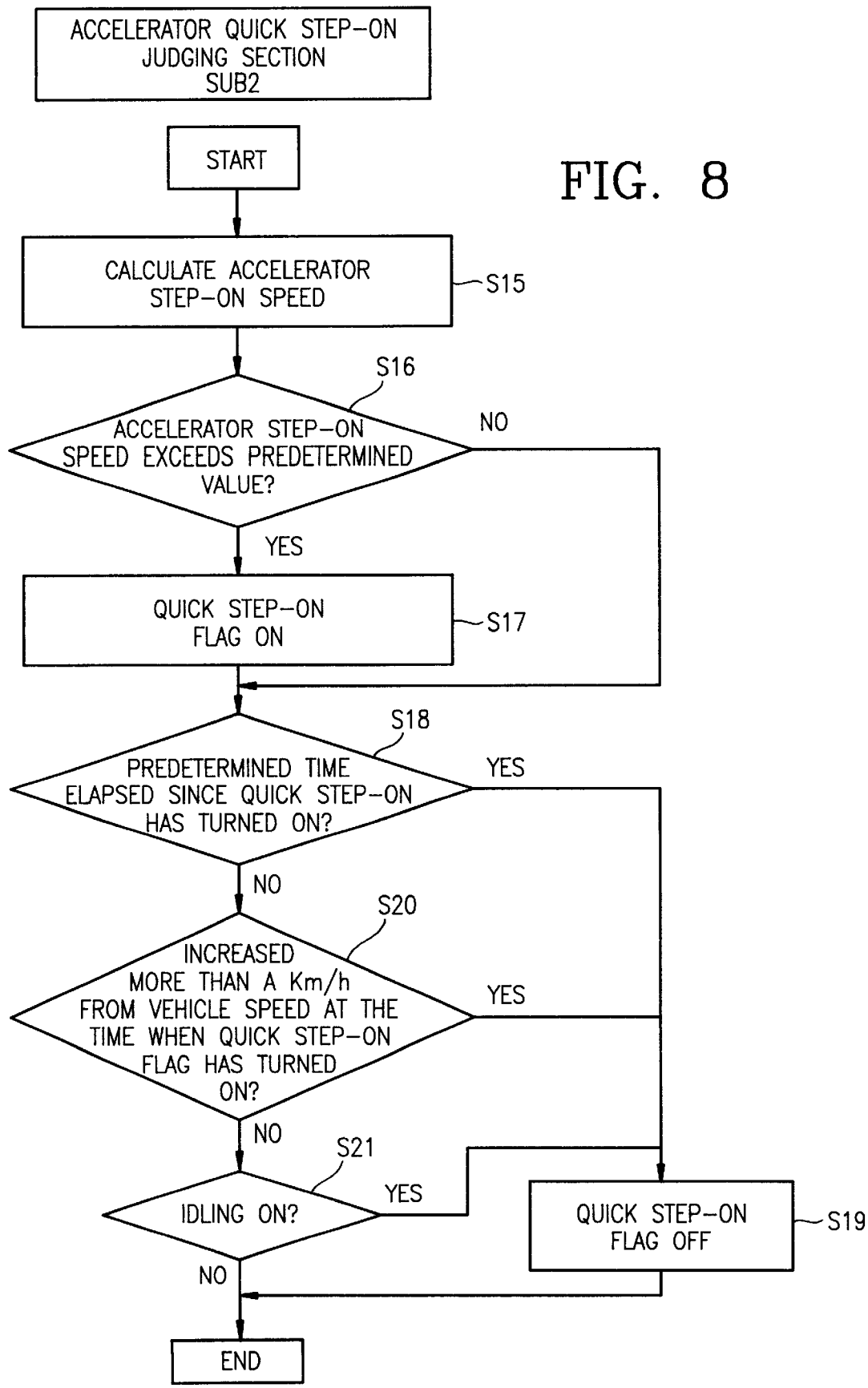
FIG. 8 is a flowchart of an accelerator operation judging subroutine ("SUB2" in FIG. 2)

Referring to FIGS. 4 and 5, by way of example, when the average vehicle speed in Step S1 is 30 km, the accelerator high-opening time in Step S2 is 5 seconds and the average accelerator speed of depression in Step S3 is 10%/second, as shown in Example 1 in FIG. 4, the fuzzy rule (1) is applied and the membership function is applied as shown in FIG. 6, thus outputting 0 as a fuzzy output. When the average vehicle speed in Step S1 is 60 km, the accelerator high-opening time in Step S2 is 15 seconds and the average speed of depression of the accelerator pedal in Step S3 is 35%/second as shown in Example 2 in FIG. 4, the fuzzy rules (4) and (9) are applied and the membership function is applied as shown in FIG. 7, thus outputting 50 as a fuzzy output.

When the fuzzy output point is more than A in Step S5, the driver type judging subroutine SUB1 judges that the driver is a sport type driver in Step S6. When the point of the fuzzy output is less than A in Step S5, the driver type judging subroutine SUB1 judges whether or not the driver is a sport type (initial value is economy type) in Step S7. When the driver has been judged to be the sport type and the point of the fuzzy output is less than B (<A) in Step S8, the driver type judging subroutine SUB1 judges that the driver is the medium type driver in Step S9 to prevent the designation of type of driver from changing immediately from the sport type to the economy type and to realize smooth control of the shift. When the point of the fuzzy output is more than B (<A) in Step S8, the judgment of the sport type is maintained.

When the driver has not been judged to be the sport type in Step S7, the process goes to Step S10 to judge whether or not the driver has been judged to be the medium type. When the driver has been judged to be the medium type, the process advances to Step S11 to judge whether or not the driver is the economy type in Step S11. Then the driver is judged to be the economy type in Step S12 when the point of the fuzzy output is less than C (<B) or the judgment of medium type is retained when the point of the fuzzy output is more than C (<B). When the type of the driver is not the medium type in Step S10, i.e., the driver is the economy type, it is judged whether or not the point of the fuzzy output is more than D (B>D>C) in Step S13. When the point is D or more (B>D>C), the process proceeds to Step S9 to judge that the driver is the medium type or retains the judgment of economy type when the point is less than D (B>D>C).

The thresholds between A and B and B and C for changing judgement between the sport type, medium type and economy type are set with hysteresis in that the threshold in the direction of changing the judgment from the sport type to the medium and economy types and in the opposite direction thereof are different to prevent the judgment from frequently changing around the thresholds. Also, the medium type positioned between the sport type and the economy type may be subdivided further into several types.

When the driver type has been determined in Step S0 in FIG. 2, the electronic control unit 9 judges whether or not the driver has a tendency in temporary acceleration in Step S14 in addition to the judgment of the overall tendency (habit) in acceleration in Step S0. This judging operation is carried out by monitoring the behavior of the driver over a time shorter than the time required for judging the driver type by the driver type judging section 17. That is, the electronic control unit 9 commands the accelerator rapid depression ("quick step-on") judging section 12 to execute an accelerator rapid depression judging subroutine SUB2 in Step S14. Then, the accelerator rapid depression judging section SUB2 calculates accelerator depression speed, at each moment while the vehicle is running, from the output of the throttle opening sensor 10 in Step S15 and judges whether or not the accelerator depression speed exceeds a predetermined value in Step S16. When the accelerator depression speed exceeds the predetermined value and is what can be characterized as rapid acceleration, the process advances to Step S17 to turn on a rapid acceleration ("quick step-on") flag. Then, it is judged whether or not a predetermined time has elapsed since the rapid acceleration flag has been turned on in Step S18.

When the predetermined time has elapsed since the time when the rapid acceleration flag was turned on, the rapid acceleration flag is turned from ON to OFF in Step S19 because it is not necessary to compensate the accelerator opening (as described later) to reflect the tendency of the driver in temporary acceleration. When the predetermined time has not elapsed since when rapid acceleration flag was turned on in Step S18, it is judged whether or not the vehicle speed has increased by more than predetermined amount A Km/h from the point of time when the rapid acceleration flag was turned on in Step S20. When the vehicle speed has been already increased by more than the predetermined amount A Km/h from the vehicle speed at the point of time when the rapid acceleration flag was turned on, the rapid acceleration flag is turned from ON to OFF in Step S19 because the purpose of acceleration has been achieved to a certain degree and it has become unnecessary to compensate the accelerator opening.

When the vehicle speed has not increased by the predetermined amount A Km/h from the vehicle speed at the point of time when the rapid acceleration flag was turned on, it is judged whether or not the engine 2 is idling in Step S21. When the engine 2 is in the idling condition, the rapid acceleration flag is turned from ON to OFF in Step S 19 because it has become unnecessary to accelerate the speed. When the engine 2 is not in the idling condition, i.e., when the predetermined time has not yet elapsed since the rapid acceleration flag was turned on, the predetermined speed A Km/h has not yet increased from the vehicle speed at the point of time when the quick step-on flag was turned on and the engine 2 is not in the idling condition, the rapid acceleration flag is retained in the ON condition by judging that the request for temporary acceleration is maintained and the control for rapid acceleration is required.

Next, the shift control program SCP proceeds to Step S22 in the main routine of FIG. 2 and commands the shift determining means 20 of the electronic control unit 9 to execute the map retrieving accelerator opening compensating subroutine SUB3. The map retrieving accelerator opening compensating subroutine SUB3 judges whether or not the rapid acceleration flag is ON in Step S23 in FIG. 9. When the rapid acceleration flag is not ON, i.e., OFF, the map retrieving accelerator opening compensating subroutine SUB3 advances to Step S24 where it judges that the driver has no intent to temporarily accelerate and sets the accelerator opening output from the throttle opening sensor 10. as the retrieved shift map accelerator opening as it is.

When the rapid acceleration flag is ON in Step S23, the map retrieving accelerator opening compensating subroutine SUB3 proceeds to Step S240 where it computes a compensation for the actual accelerator opening based on the following expression:

Compensation=Accelerator Depression Speed (%/25 msec.)$\times$*K wherein *K is an Accelerator Opening Compensation Factor The accelerator opening compensation factor *K is set so that the greater the shift step, the greater the value and the compensation becomes as shown in FIG. 10a.

When the compensation is found, the process proceeds to Step S25 to judge whether or not the compensation is greater than an accelerator opening compensation guard *G which has been set as the maximum value for the compensation. When the compensation is greater than the accelerator opening compensation guard *G, the compensation is made equal to *G in Step S26. The accelerator opening compensation guard *G is set so that the closer the driver type is to the sport type, as opposed to the economy type, i.e., the stronger the overall tendency to accelerate, the smaller it becomes. The closer the driver type is to the economy type, the larger the maximum allowable compensation becomes.

When the compensation is not greater than the accelerator opening compensation guard *G in Step S25 or the compensation is set at the upper limit value of the accelerator opening compensation guard *G in Step S26, the process proceeds to Step S27 to set the retrieved shift map accelerator opening at a value obtained by adding the above-mentioned compensation to the actual accelerator opening which is an output from the throttle opening sensor 10.

Figure 11:
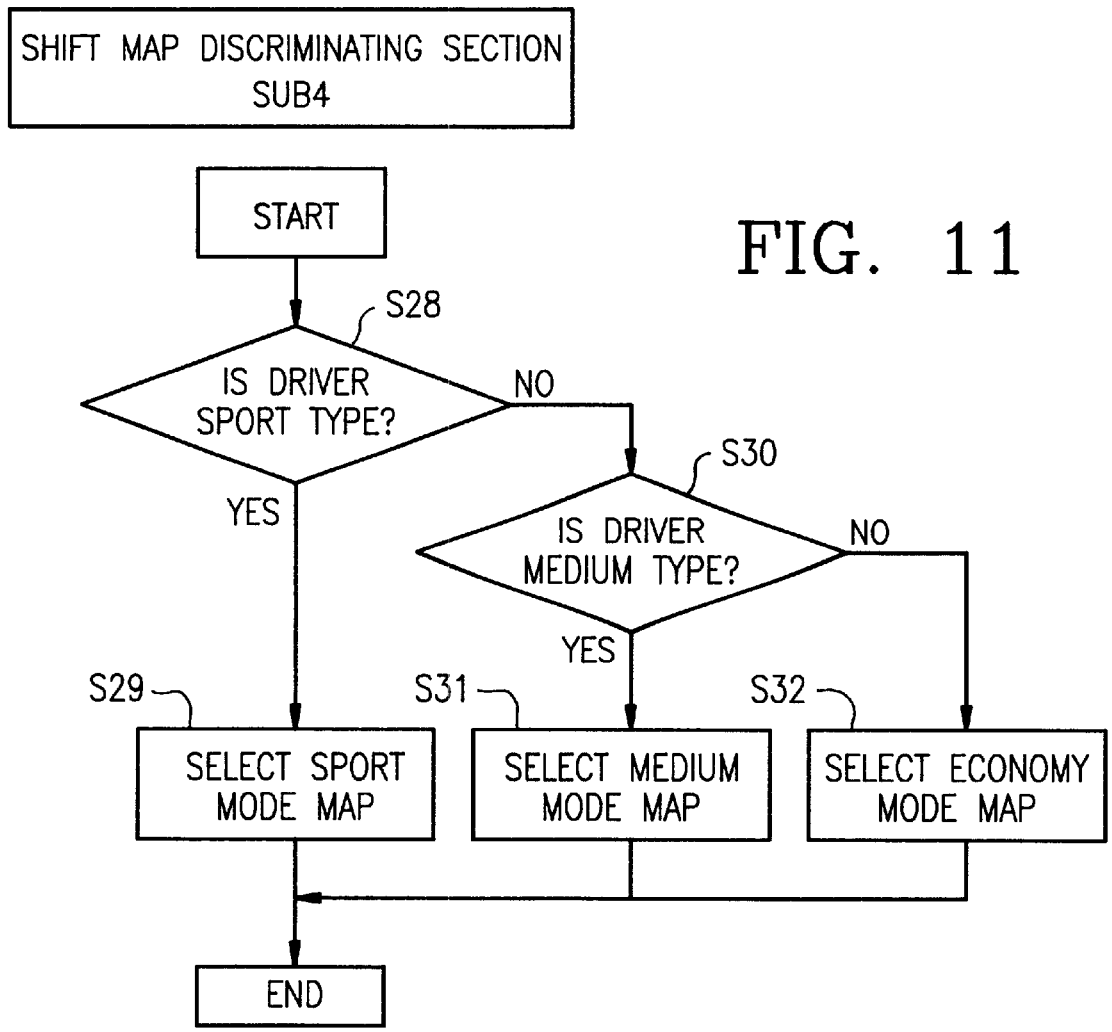
FIG. 11 is a flowchart of a shift map judging subroutine ("SUB4" in FIG. 2)

When the shift map accelerator opening has been thus computed and determined in Step S24 or 27, the shift control program SCP proceeds to Step S27 in FIG. 2 so that the shift determination means 20 executes a shift map determination subroutine SUB4 as shown in FIG. 11. The shift map determination subroutine SUB4 judges whether or not the driver type judged by the driver type judging subroutine SUB1 in Step S1 is the sport type in Step S28. When the driver is the sport type, the process proceeds to Step S29 to select a sport mode map SPORT from among three types of running mode maps, i.e., from among an economy mode map ECONOMY in FIG. 13, a medium mode map MEDIUM in FIG. 14 and a sport mode map SPORT in FIG. 15.

Figure 13:
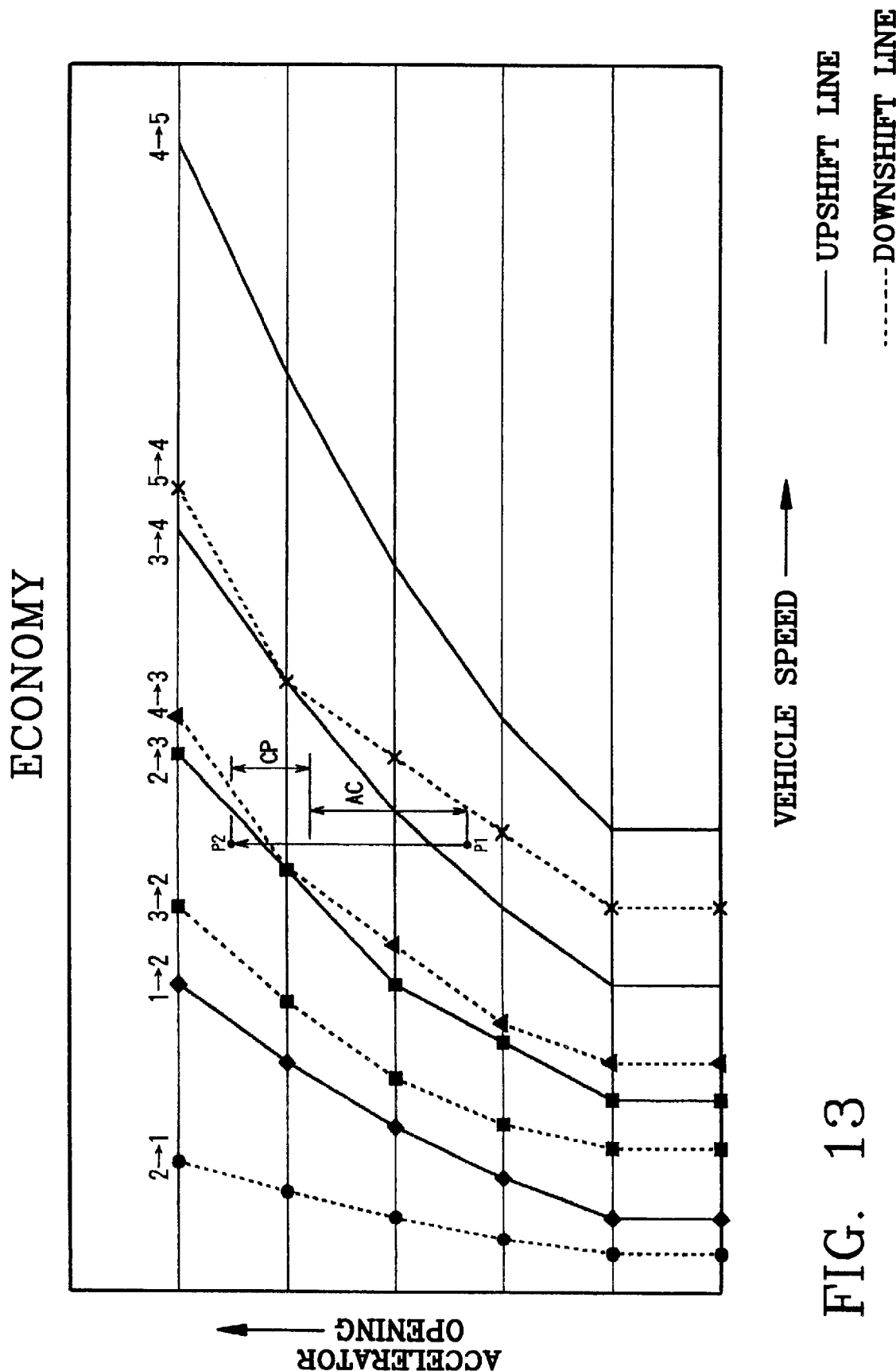
FIG. 13 is a graph which is one example of an economy mode map used in the subroutine of FIG. 11.
Figure 14:
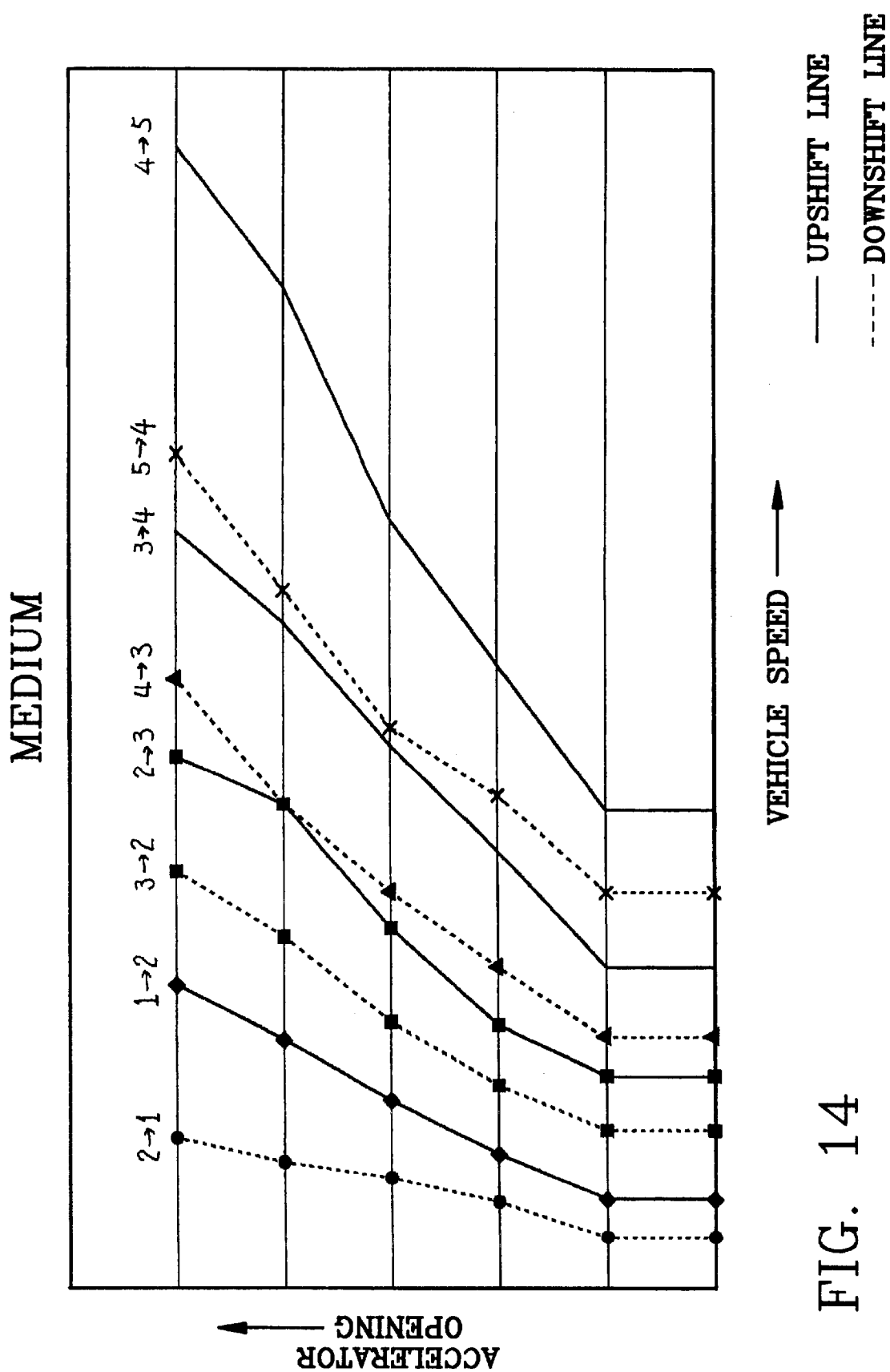
FIG. 14 is a graph which is one example of a medium mode map used in the subroutine of FIG. 11.
Figure 15:
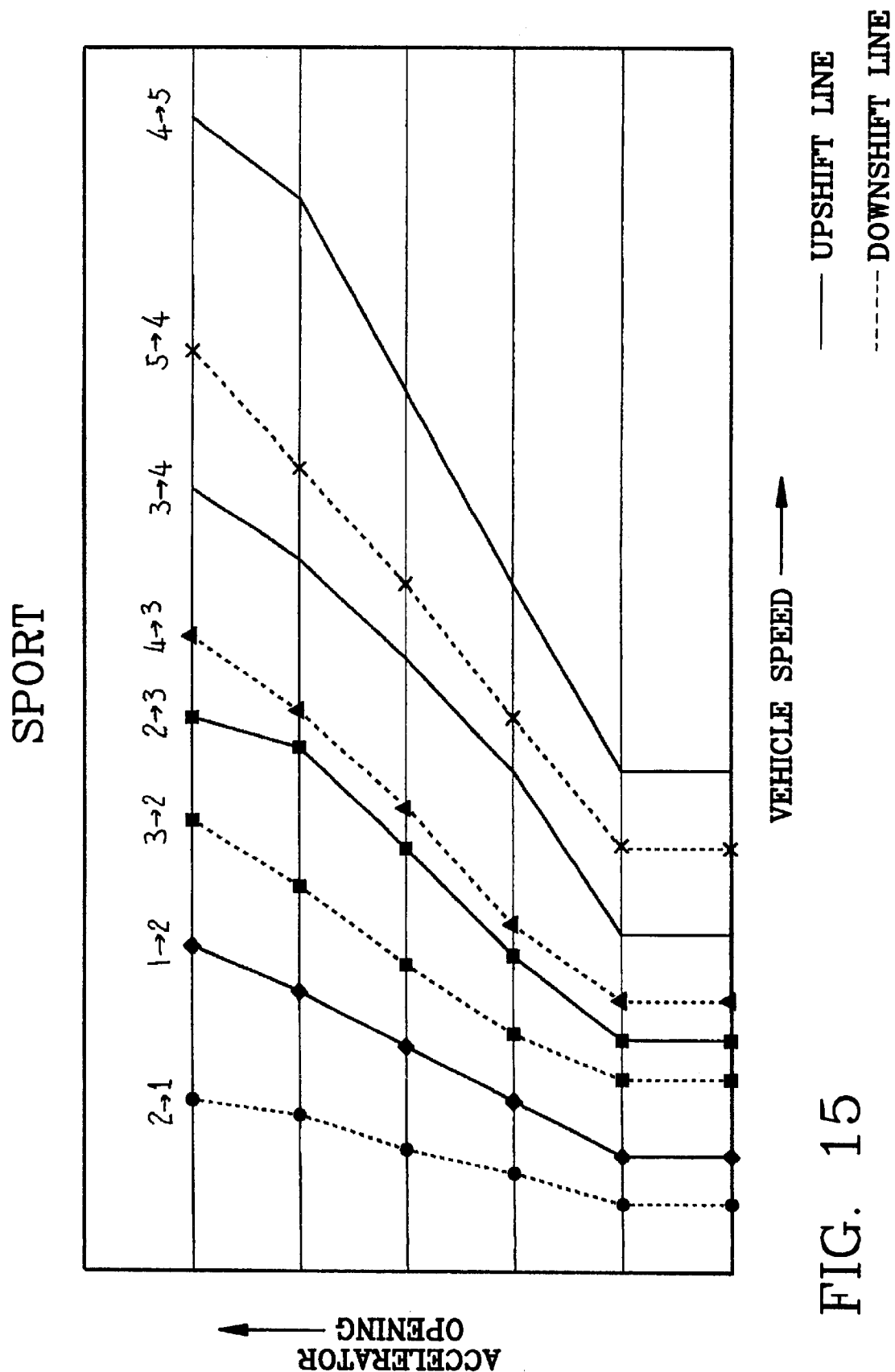
FIG. 15 is a graph which is one example of a sport mode map used in the subroutine of FIG. 11.

As is apparent from the maps, the vehicle speed and the accelerator opening are set as parameters in the economy mode map ECONOMY in FIG. 13, the medium mode map MEDIUM in FIG. 14 and the sport mode map SPORT in FIG. 15, and upshift lines and downshift lines are shifted further to the high-speed side as the type advances from the economy mode map ECONOMY to the medium mode map MEDIUM and then to the sport mode map SPORT. These maps are arranged such that the downshift is carried out at low accelerator opening and the lower speed side gear step is selected as the type advances from the economy mode map ECONOMY to the medium mode map MEDIUM and then to the sport mode map SPORT at the same vehicle speed. Further, for the same accelerator opening, the upshift is shifted further to the higher-speed side as the type advances from the economy mode map ECONOMY to the medium mode map MEDIUM and then to the sport mode map SPORT. That is, the upshift line is set for a "sporty" style so that the lower speed side gear step may be readily selected.

When the driver type judged by the driver type judging subroutine SUB1 in Step S1 is not the sport type in Step S28, the process goes to Step S30 to judge whether or not the driver type is the medium type. When the driver type is the medium type, the process proceeds to Step S31 to select the medium mode map MEDIUM in FIG. 14.

When the driver type is judged not to be the medium type in Step S30, i.e., judged to be the economy type, the process goes to Step S32 to select the economy mode map ECONOMY in FIG. 13.

When the shift map to be used in shifting and the accelerator opening for retrieving the shift map are thus decided by the shift control program SCP, the electronic control unit 9 executes a shift operation in the transmission 3 by the shift output means 21 based on the shift map and the shift map retrieving accelerator opening thus decided. When the accelerator opening is used to retrieve the shift map, the map is retrieved using a value for accelerator opening greater than the actual accelerator opening, regardless of the shift map to be used, i.e., the economy mode map ECONOMY, the medium mode map MEDIUM or the sport mode map SPORT, when the rapid acceleration flag is ON, i.e., when the inclination for temporary acceleration is set by passing or the like. Each shift map is retrieved according to a shift map retrieving accelerator opening to which the compensation found in Step S24 is added in Step S27 in FIG. 9. Accordingly, the downshift and upshift lines are shifted to the high-speed side for all driver types and, as a result, the timing is changed to the acceleration oriented shift timing.

The accelerator opening compensation guard *G, which is the upper limit value in computing the compensation of the map retrieving accelerator opening by the compensating subroutine SUB3, is set such that it becomes greater as the driver type advances from the sport type to the economy type and a greater compensation may be added for rapid (temporary) acceleration, so that the map is retrieved in accordance with the value for accelerator opening as increased for the inclination in temporary acceleration. The shift timing is accordingly shifted far to the high-speed side and sufficient acceleration may be obtained even if the downshift and upshift lines of the economy mode map ECONOMY have been shifted more to the lower-speed side than in the sport mode map SPORT.

Figure 9:
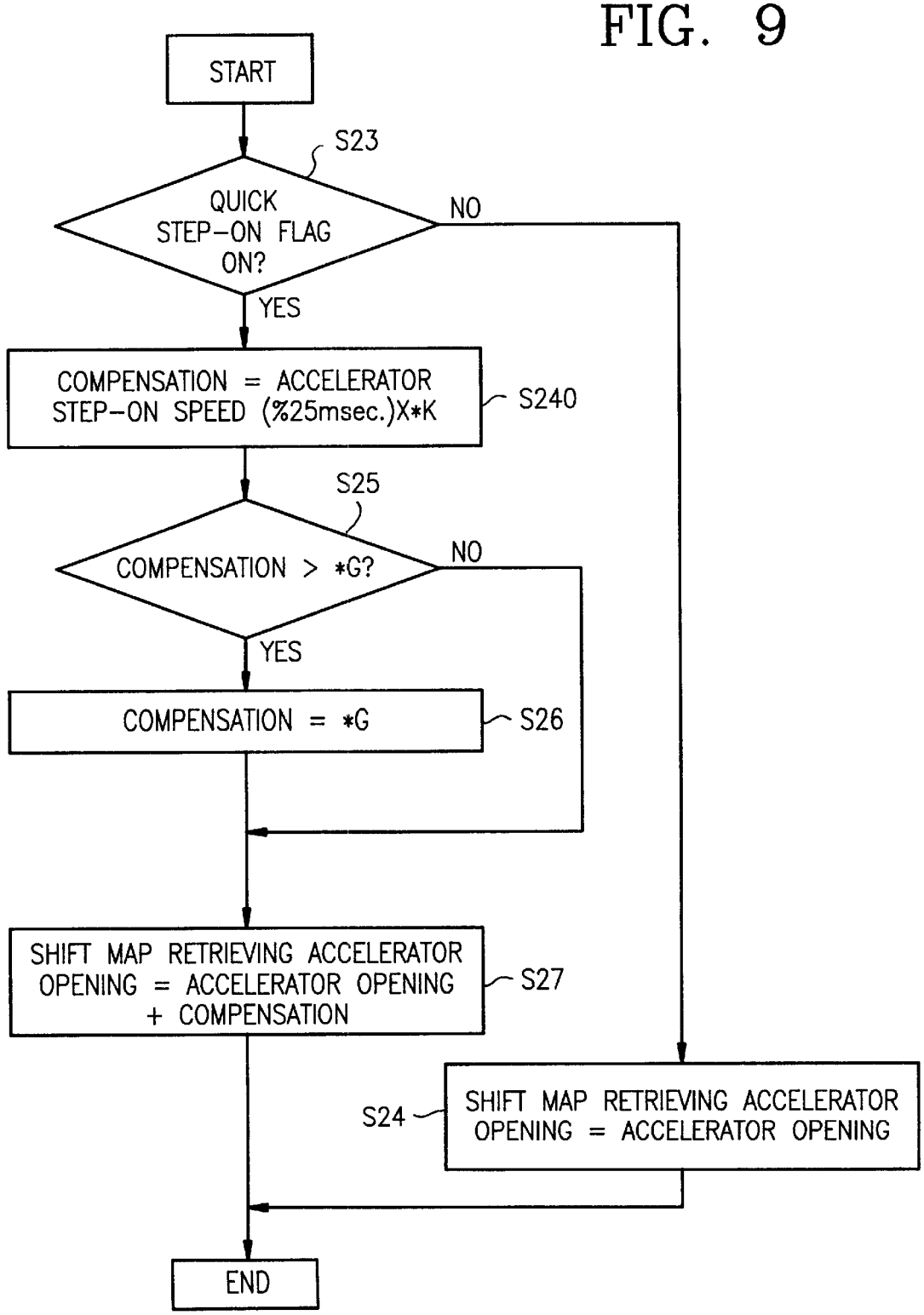
FIG. 9 is a flowchart of a map retrieving accelerator opening compensating subroutine ("SUB3" in FIG. 2)

When a passing operation has been completed and the driver no longer intends acceleration, the rapid acceleration ("quick step-on") flag is turned off in Step S14 in FIG. 1, so that the accelerator opening from the throttle opening sensor 10 is used as is, as the shift map retrieving accelerator opening, in determining the shift map corresponding to the driver type judged by the shift map determination subroutine SUB4 in Step S24 in FIG. 9. Accordingly, because the shift operation is carried out according to the shift map corresponding to the driver type determined by the driver type judging SUB1, based on the long term monitoring, the driver can return to normal driving operation without feeling any sense of discomfort.

Figure 12:
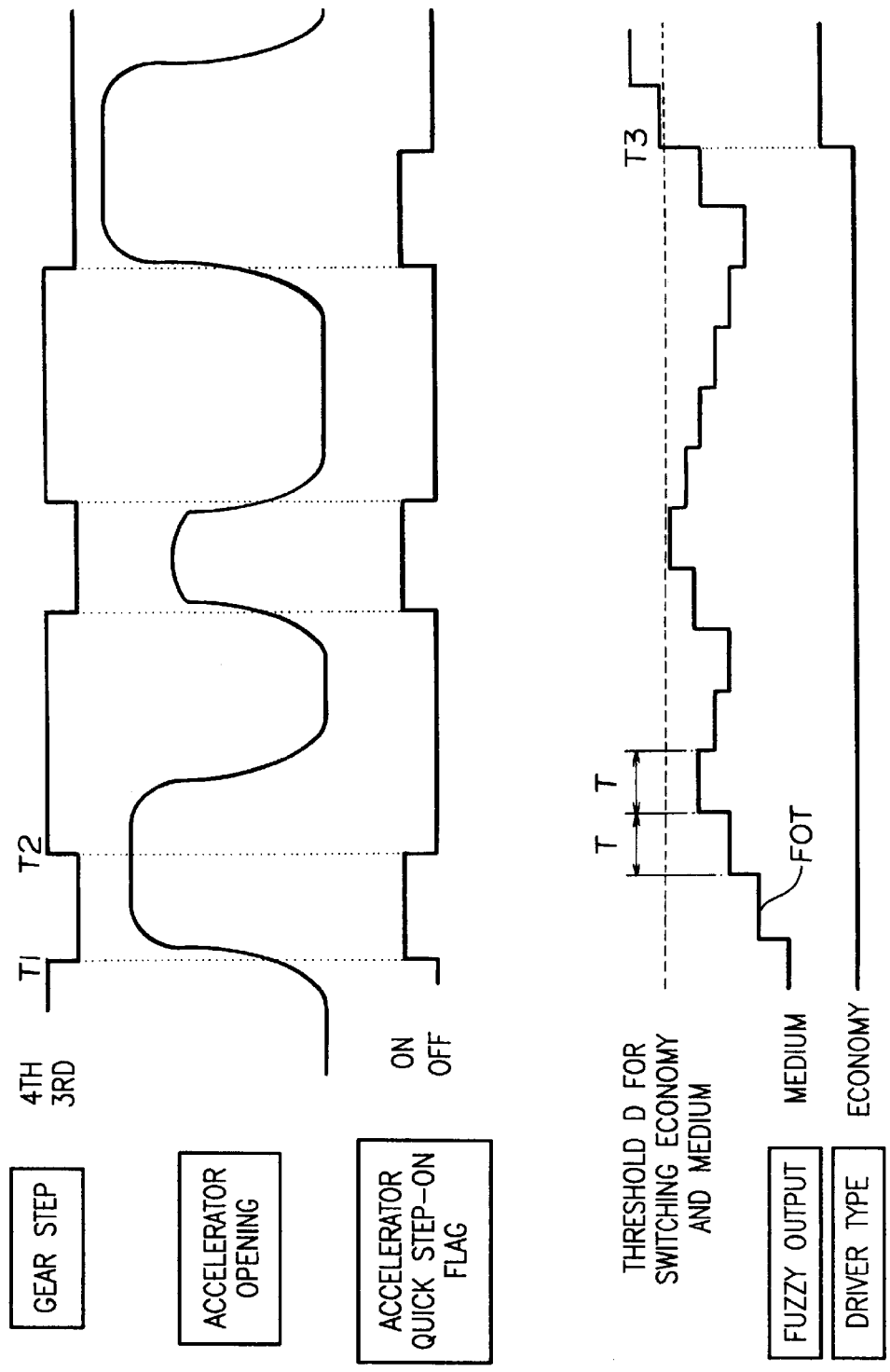
FIG. 12 shows one example of a timing chart as used in judging accelerator operation and in judging driver type.

FIG. 12 shows examples in which the present invention is applied to actual driving conditions. Suppose that a driver, who has been judged to be the economy type by the driver type judging section 17, steps on the accelerator quickly, for the need of passing or the like at point of time T1 while driving in fourth speed. Then, the rapid acceleration flag is turned on by the rapid acceleration judging section 12, the economy mode map ECONOMY shown in FIG. 13 is retrieved using a value for the shift map retrieving accelerator opening to which the compensation corresponding to the economy type driver is added, by the map retrieving accelerator opening compensating routine SUB3 of the shift discriminating means 20, and the shift timing is determined for the value obtained by adding the compensation to the actual accelerator opening detected from the throttle opening sensor 10.

Because the accelerator opening on the map moves from point P1 to point P2 in FIG. 13, for example, such that the compensation CP is added to the actual accelerator opening AC detected by the throttle opening sensor 10, in determining the shift timing from the economy mode map ECONOMY, the downshift is carried out and the acceleration inclination of the driver may be reflected appropriately, even though the downshift is not in accordance with the actual accelerator opening AC detected from the throttle opening sensor 10.

Thus, the gear stage is downshifted from fourth to third and the rapid acceleration flag is turned from ON to OFF at the point of time T2 in FIG. 12, the addition of the compensation CP to the accelerator opening is eliminated as shown in Step S24 in FIG. 9, so that the economy mode map ECONOMY is retrieved by the actual accelerator opening AC detected by the throttle opening sensor 10, control returns to the normal economy type shift map and the driving mode returns to the economy type mode.

Meanwhile, although the fuzzy inference routine of Step S4 in the driver type judging routine SUB1 in FIG. 3 computes the type of the driver continuously as fuzzy output FOT, the driving style is judged per time interval T, e.g., 30 seconds, to judge the overall driving style of the driver and its result is maintained until the next time period T elapses as described before. Accordingly, the judgment of the driver type as the fuzzy output FOT is made, not only according to whether or not a rapid acceleration has been made, but also according to a plurality of parameters such as average vehicle speed, accelerator high opening time, average rapid depression speed and the like which indicate the driving behavior of the driver as shown in FIG. 4. Thereby, the driver type is changed from the economy type to the medium type at the point of time T3 in FIG. 12, for example.

When the driver type is changed from the economy type to the medium type, the shift map used in judging the shift timing is changed from the economy mode map ECONOMY to the medium mode map MEDIUM and the shift timing thereafter is carried out based on the medium mode map MEDIUM. When the rapid acceleration flag is turned on due to rapid accelerator depression or the like, even when the normal shift operation is carried out by the medium mode map MEDIUM, the retrieval by the shift map retrieving. accelerator opening is carried out in the same manner as described above to correspond to the acceleration tendency of the driver by adding the compensation CP to the accelerator opening AC based on the medium mode map MEDIUM.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic transmission controller capable of changing shift timing of a transmission in accordance with acceleration behavior of a driver, comprising:

driver type judging means for judging a driver type in accordance with the acceleration of the driver, as one of a plurality of driver types, by monitoring the driving behavior of the driver over a predetermined period of time;

temporary acceleration inclination judging means for judging the temporary inclination of the driver in temporary acceleration by monitoring said driving behavior for a time shorter than said predetermined period of time; and shift control means for controlling and changing said shift timing based on the driver type judged by said driver type judging means and the temporary inclination judged by said temporary acceleration inclination judging means.

2. The automatic transmission controller according to claim 1, wherein said temporary acceleration inclination judging means judges that the driver has the temporary inclination when the speed of accelerator depression exceeds a predetermined value.

3. The automatic transmission controller according to claim 2, wherein said temporary acceleration inclination judging means judges that the driver has the temporary inclination when the speed of accelerator depression exceeds a predetermined value.

4. The automatic transmission controller according to claim 1, wherein said shift control means changes the shift timing for a driver type based on the temporary inclination judged by said temporary acceleration inclination judging means.

5. The automatic transmission controller according to claim 4, wherein said shift timing for each driver type is stored as a shift map wherein accelerator opening is one parameter and said shift control means computes a compensation value for the accelerator opening based on said temporary inclination, computes a shift map retrieving accelerator opening by adding said compensation value to the actual accelerator opening and changes the shift timing by retrieving said shift map based on the computed shift map retrieving accelerator opening.

6. The automatic transmission controller according to claim 5, wherein said driver type judging means judges the driver type as one of at least into two driver types, including a high acceleration inclination type and low acceleration inclination type and said shift control means limits said accelerator opening compensation as the judged driver type goes from the low acceleration inclination type toward the high acceleration inclination type.

7. The automatic transmission controller according to claim 5, wherein said driver type judging means judges the driver type as one of at least into two driver types, including a high acceleration inclination type and low acceleration inclination type and said shift control means raises the maximum value of said accelerator opening compensation as the judged driver type goes from the high acceleration inclination type toward the low acceleration inclination type.

* * * * *